(12) United States Patent
Ogawa (10) Patent No.: US 7,084,921 B1
(45) Date of Patent: Aug. 1, 2006

(54) IMAGE PROCESSING APPARATUS WITH ANOTHER DISPLAY UNIT ITS CONTROL METHOD, AND RECORDING MEDIUM

(75) Inventor: Yasuyuki Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/542,343

(22) Filed: Apr. 5, 2000

(30) Foreign Application Priority Data

Apr. 12, 1999   (JP)   ................... 11-104544

(51) Int. Cl.
  *H04N 5/225*   (2006.01)
  *G03B 7/26*   (2006.01)
  *H04N 5/76*   (2006.01)

(52) U.S. Cl. ........................... 348/372; 396/277

(58) Field of Classification Search ................ 348/372; 396/277, 278, 279; 455/574, 343.5
See application file for complete search history.

(56) References Cited

U.S. PATENT DOCUMENTS

| | | | | |
|---|---|---|---|---|
| 5,527,630 A | * | 6/1996 | Nagata et al. | ................. 429/7 |
| 5,784,525 A | * | 7/1998 | Bell | ............................ 386/107 |
| 5,949,484 A | * | 9/1999 | Nakaya et al. | ............ 348/384.1 |
| 5,963,255 A | * | 10/1999 | Anderson et al. | ............ 348/372 |
| 6,031,999 A | * | 2/2000 | Ogawa | ........................ 396/303 |
| 6,075,949 A | * | 6/2000 | Hatakenaka et al. | ........ 396/301 |
| 2003/0169349 A1 | * | 9/2003 | Aoi et al. | ................. 348/231.2 |

FOREIGN PATENT DOCUMENTS

JP    11-261937    9/1999

* cited by examiner

*Primary Examiner*—Tuan Ho
*Assistant Examiner*—Timothy J. Henn
(74) *Attorney, Agent, or Firm*—Fitzpatrick, Cella, Harper & Scinto (57) ABSTRACT

There is disclosed an image processing apparatus in which a system control circuit (50) monitors the power source voltage when data write access to a recording medium (200) occurs, and cuts off power supply to an image display unit (28) when the power source voltage becomes smaller than a predetermined value L2, so as to reduce write errors of data to be written resulting from a power source voltage drop, a control method of the image processing apparatus, and a storage medium.

16 Claims, 7 Drawing Sheets

IMAGE PROCESSING APPARATUS WITH ANOTHER DISPLAY UNIT ITS CONTROL METHOD, AND RECORDING MEDIUM

BACKGROUND OF THE INVENTION

1. Field of the Invention

The present invention relates to an image processing apparatus for photographing, recording, reproducing, and processing still and moving images, its control method, and a recording medium.

2. Related Background Art

Conventionally, image processing apparatuses such as electronic cameras and the like, which record/reproduce still and moving images using memory cards having solid state memory elements as recording media have already been commercially available, and electronic cameras with electronic viewfinders such as color liquid crystal panels and the like have also been commercially available.

These electronic cameras can reproduce images recorded on a memory card, and write to a memory card is frequently made during reproduction. For example, while reviewing the reproduced images, an image is erased, a print designation file is generated on a memory card, and so forth.

In such a conventional reproduction apparatus, when the power source voltage to the system drops during file access to a memory card, writing of an image is interrupted so as not to destroy the file system on the memory card. In such case, since the last image written in the recording medium (such as a memory card) cannot be completely recorded due to a system problem, i.e., a drop of the power source voltage, the final state of images on the memory card is different from that which the user intended.

Before recording image data, it is possible to check if the power source voltage is sufficiently high. For example, when image data has a large size and recording requires much time, or when a battery or the like cannot fully exhibit its performance due to low temperature, electric power is consumed quickly. For this reason, even when the power source voltage is sufficiently high before image recording, the voltage drops during recording and, consequently, an image often fails to be recorded.

A voltage drop warning may be generated. However, when the warning is generated at the instant of image recording, electric power may be used up halfway through the recording, and the user may miss an important shutter chance.

The aforementioned problem is highly likely to occur when data other than an image, such as a print designation file or the like, is recorded in addition to image data.

SUMMARY OF THE INVENTION

It is an object of the present invention to solve all or at least one of the aforementioned problems.

It is another object of the present invention to provide an image processing apparatus and method, and a storage medium, which can minimize unsuccessful image recording processes due to a drop of the power source voltage.

It is still another object of the present invention to provide an image processing apparatus and method, and a storage medium, which can minimize image recording failures resulting from a voltage drop during recording.

In order to achieve the above objects, according to a preferred embodiment of the present invention, there is disclosed an image processing apparatus comprising:

a recording unit for recording given image data or data other than the image in a recording medium;

a power supply unit for supplying electric power to the image processing apparatus;

a judging unit for judging, during write of the image data in the recording medium, if a power supply capacity of the power supply unit becomes smaller than a predetermined first capacity; and a power supply control unit for reducing the electric power to be supplied to the image processing apparatus while assuring electric power to be supplied to the recording unit when the supply capacity of the power supply unit becomes smaller than the predetermined first capacity.

There is also disclosed an image processing apparatus comprising:

a recording unit for recording given image data or data other than the image in a recording medium;

a display unit for displaying the image;

a power supply unit for supplying electric power to the display unit;

a judging unit for judging, during write of the image data or the data other than the image in the recording medium, if a power supply capacity of the power supply unit becomes smaller than a predetermined first capacity; and a power supply control unit for reducing the electric power to be supplied to the display unit when the supply capacity of the power supply unit becomes smaller than the predetermined first capacity.

It is still another object of the present invention to inform the user of a drop of electric power performance.

It is still another object of the present invention to also inform the user of a drop of electric power that takes place during image recording.

In order to achieve the above object, according to a preferred embodiment of the present invention, there is disclosed an image processing apparatus, which comprises warning means for checking if the power supply capacity of the power supply means becomes smaller than second capacity larger than the first capacity, and producing a warning when a checking result is affirmative, in addition to the aforementioned arrangement.

The above and other objects and features of the present invention will become apparent from the following description of the preferred embodiments taken in conjunction with the accompanying drawings.

BRIEF DESCRIPTION OF THE DRAWINGS

FIG. 1, which is composed of FIGS. 1A and 1B, is comprised of block diagrams showing the circuit construction in one embodiment.

DETAILED DESCRIPTION OF THE PREFERRED EMBODIMENTS

The preferred embodiments of the present invention will be described hereinafter with reference to the accompanying drawings.

Figures 1, 1A:
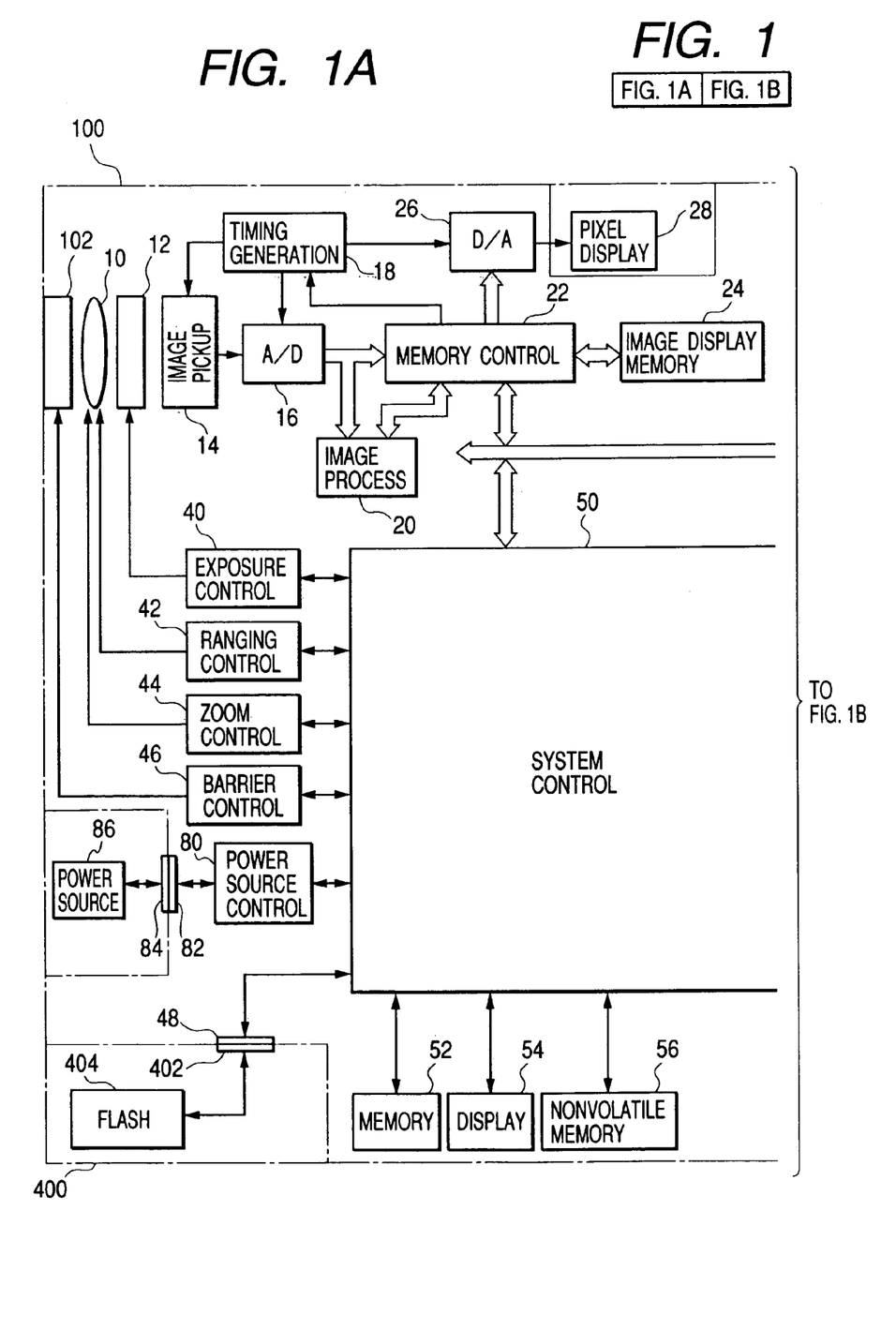
Figure 1B:
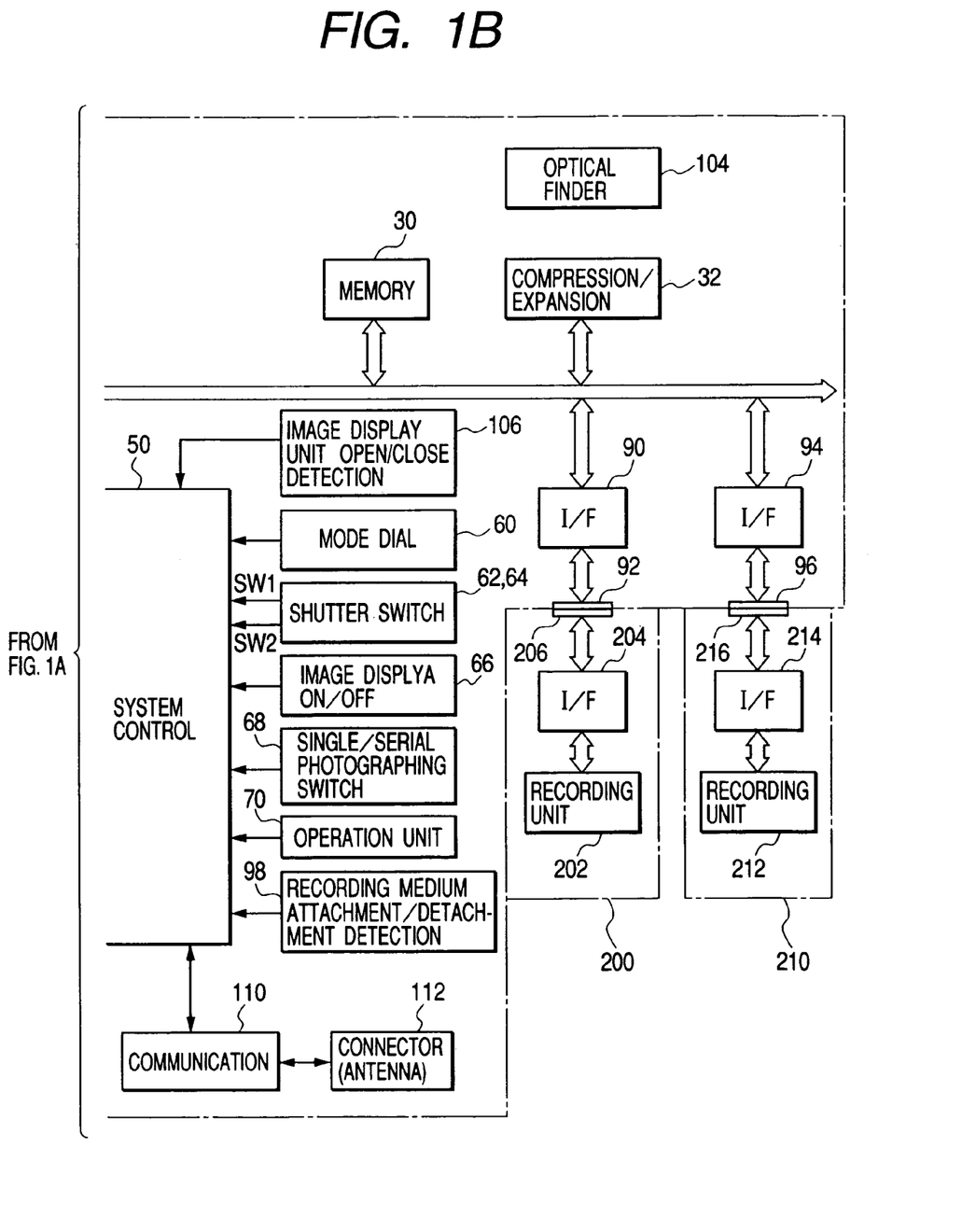

FIGS. 1A and 1B show the circuit arrangement according to an embodiment of the present invention. Referring to FIGS. 1A and 1B, an image processing apparatus 100 comprises a photographing lens 10, and a shutter 12 with a stop function. An image pickup element 14 converts an optical image into an electrical signal, and an A/D converter 16 converts an analog signal output from the image pickup element 14 into a digital signal.

A timing generation circuit 18 supplies clock signals and control signals to the image pickup element 14, the A/D converter 16, and a D/A converter 26, and is controlled by a memory control circuit 22 and system control circuit 50.

An image processing circuit 20 performs predetermined pixel interpolation and color conversion for data supplied from the A/D converter 16 or the memory control circuit 22. The image processing circuit 20 makes predetermined computations using photographed image data to execute a TTL (Through The Lens) AF (auto focus) process, AE (auto exposure) process, and EF (flash pre-emission) process in which the system control circuit 50 controls an exposure control means 40 and ranging control means 42 on the basis of the obtained computation results. Furthermore, the image processing circuit 20 makes predetermined computations using photographed image data, and executes a TTL AWB (auto white balance) process on the basis of the obtained computation results.

The memory control circuit 22 controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or memory 30 via the image processing circuit 20 and memory control circuit 22 or directly via the memory control circuit 22.

The image display memory 24 is connected to the D/A converter 26 via the memory control circuit 22. An image display unit 28 comprises a TFT LCD or the like. Display image data written in the image display memory 24 is displayed by the image display unit 28 via the D/A converter 26. When photographed image data are displayed at photographing timings using the image display unit 28, an electronic viewfinder function can be implemented. The image display unit 28 can arbitrarily turn on/off its display in response to an instruction from the system control circuit 50. When the display is turned off, the power consumption of the image processing apparatus 100 can be greatly reduced.

Furthermore, the image display unit 28 is coupled to the image processing apparatus 100 main body via a rotatable hinge, and its various display functions, such as the electronic viewfinder function, reproduction display function, and the like, can be used while setting the image display unit 28 in a desired direction and angle. Also, the image display unit 28 can be stored so that its display surface faces the image processing apparatus 100. In such case, an image display unit open/close detection means 106 can detect the storage state, and can stop the display operation of the image display unit 28 when in the stored position.

The memory 30 stores photographed still and moving images. The memory 30 has a storage capacity large enough to store a predetermined number of still images or a moving image for a predetermined period of time. With this arrangement, even in a serial or panoramic photographing mode for continuously photographing a plurality of still images, many images can be written in the memory 30 at high speed. Also, the memory 30 can be used as a work area of the system control circuit 50.

The compression/expansion circuit 32 compresses/expands image data by adaptive discrete cosine transformation (ADCT) or the like. The compression/expansion circuit 32 reads an image stored in the memory 30, compresses or expands it, and writes the processed data in the memory 30. The exposure control means 40 controls the shutter 12 with the stop function. The exposure control means 40 also has a flash light control function in cooperation with an electronic flash unit 400.

The ranging control means 42 controls focusing of the photographing lens 10. The exposure control means 40 and ranging control means 42 are controlled using TTL, and the system control circuit 50 controls the exposure control means 40 and ranging control means 42 on the basis of computation results of photographed image data by the image processing circuit 20.

A zoom control means 44 controls zooming of the photographing lens 10, and a barrier control means 46 controls the operation of a protection means 102 serving as a barrier. A connector 48 is also called an accessory shoe, and also comprises electrical contacts and mechanical fixing means for the electronic flash unit 400.

The system control circuit 50 controls the overall image processing apparatus 100, and a memory 52 stores constants, variables, programs, and the like for operations of the system control circuit 50.

An indication unit (display) 54 includes a liquid crystal display device, loudspeaker, and the like, and indicates operation states, messages, and the like using characters, images, voices, and the like in accordance with execution of a program by the system control circuit 50. The indication unit 54 is placed at one or a plurality of positions around the operation unit of the image processing apparatus 100, that are easy to see, and is comprised of a combination of an LCD, LEDs, tone generation element, and the like. Some functions of the indication unit 54 are placed within an optical viewfinder 104.

Of the indication contents of the indication unit 54, those indicated on an LCD or the like include, e.g., a single/serial photographing indication, self-timer indication, compression ratio indication, recording pixel count indication, recording image count indication, remaining photographable image count indication, shutter speed indication, aperture value indication, exposure correction indication, flash indication, red-eye suppression indication, macro-photographing indication, buzzer setting indication, timepiece battery remaining capacity indication, error indication, information indication using numerals of a plurality of digits, loading/unloading state indication of recording media 200 and 210, communication I/F operation indication, date/time indication, and the like.

Of the indication contents of the indication unit 54, those indicated within the optical viewfinder 104 include, e.g., an in-focus indication, camera shake alert indication, flash charging indication, shutter speed indication, aperture value indication, exposure correction indication, and the like.

An electrically rewritable nonvolatile memory 56 uses, e.g., an EEPROM.

Operation means 60, 62, 64, 66, 68, and 70 are used to input various operation instructions of the system control circuit 50. These operation means are constructed by one or a plurality of combinations of a switch, a dial, a touch panel, a pointer using line of sight detection, a voice recognition device, and the like.

An example of these operation means will be explained below.

A mode dial switch 60 can switch various function modes such as power OFF, an automatic photographing mode, photographing mode, panoramic photographing mode, reproduction mode, multi-frame reproduction/erase mode, PC connection mode, and the like.

A shutter switch SW1 62 is turned on in the middle of operation (half-stroke depression) of a shutter button (not shown), and instructs start of an AF (auto focus) process, AE (auto exposure) process, AWB (auto white balance) process, EF (flash pre-emission) process, and the like.

A shutter switch SW2 64 is turned on upon completion of operation (full stroke depression) of the shutter button, and instructs the start of a series of processes including an exposure process for writing a signal read out from the image sensing element 14 as image data in the memory 30 via the A/D converter 16 and memory control circuit 22, a development process using computation results in the image processing circuit 20 and memory control circuit 22, and a recording process for reading out image data from the memory 30, compressing the readout data by the compression/expansion circuit 32, and writing the compressed image data in the recording medium 200 or 210.

An image display ON/OFF switch 66 can set an ON/OFF state of the image display unit 28. With this function, when current supply to the image display unit 28 comprising the TFT LCD or the like is cut off upon photographing using the optical viewfinder 104, power savings can be attained.

A single/serial photographing switch 68 can set a single photographing mode, in which an image for one frame is photographed upon depression of the shutter switch SW2, whereafter a standby state is set, and a serial photographing mode, in which photographing is continuously performed while the shutter switch SW2 is held down.

An operation unit 70 is comprised of various buttons, touch panel, and the like, which include the following buttons, i.e., a menu button, set button, macro button, multi-frame reproduction new page button, flash setting button, single/serial photographing/self-timer select button, menu move + (plus) button, menu move − (minus) button, reproduced image move + (plus) button, reproduced image move − (minus) button, photographed image quality select button, exposure correct button, date/time setting button, select/switch button for selecting and switching various functions upon executing photographing and reproduction in, e.g., the panorama mode, button for starting audio recording, determine/execute button for determining and executing various functions upon executing photographing and reproduction in, e.g., the panorama mode, image display ON/OFF switch for turning ON/OFF the image display unit 28, quick review ON/OFF switch for setting a quick review function of automatically reproducing photographed image data immediately after photographing, compression mode switch serving as a switch for selecting a JPEG compression ratio or selecting a CCDRAW mode that directly converts a signal output from the image pickup element into digital data and records the digital data in the recording medium, reproduction mode switch which can set various function modes such as a reproduction mode, multi-frame reproduction/erase mode, PC connection mode, and the like, reproduction switch for instructing to start a reproduction process for reading out an image photographed in the photographing mode from the memory 30 or the recording medium 200 or 210, and displaying the readout image on the image display unit 28, drive button for changing an active drive, reproduction display select button for selecting single- or multi-image display upon reproduction, information display button for displaying additional information of a recorded image, and the like.

Using the aforementioned operation unit, a plurality of images to be automatically printed can be selected while the reproduction mode is selected, and generation of a DPOF (Digital Print Order Format: trademark) for designating the print format can be instructed to record such file on the recording medium.

A power source control means 80 is comprised of a battery detection circuit, DC—DC converter, switch circuit for switching a block to be energized, and the like. The power source control means 80 detects the presence/absence, type, and remaining battery amount of a battery attached, controls the DC—DC converter on the basis of such detection results and an instruction from the system control circuit 50, and supplies a required voltage to the respective units including the recording medium 200 for a required period of time. The power source control means 80 can shut down the power source in response to an instruction from the system control circuit 50.

A power source means 86 is connected to the power source control means 80 via connectors 82 and 84, and includes a primary battery such as an alkali battery, lithium battery, or the like, a secondary battery such as an NiCd battery, NiMH battery, Li Battery, or the like, an AC adapter, and the like.

The recording media 200 and 210, such as a memory card, hard disk, and the like, are connected to the image processing apparatus via interfaces 90 and 94 and connectors 92 and 96. A recording medium attachment/detachment detection means 98 detects whether or not the recording medium 200 or 210 is attached to the connector 92 and/or the connector 96.

Note that this embodiment has two sets of interfaces and connectors that receive the recording media. Of course, the number of sets of interfaces and connectors that receive the recording media is not particularly limited. Also, combinations of interfaces and connectors of different standards may be used. As the interface and connector, those complying with the standards of a PCMCIA card, CF (compact flash) card, and the like may be used.

When the interfaces 90 and 94, and connectors 92 and 96 use those complying with the standards of a PCMCIA card, CF (compact flash) card, and the like, various communication cards such as a LAN card, modem card, USB card, IEEE1394 card, P1284 card, SCSI card, PHS, and the like are connected thereto, image data and associated management information can be transferred between the image processing apparatus 100 and another computer or its peripheral devices such as a printer and the like.

The protection means 102 serves as a barrier which covers an image pickup unit including the lens 10 of the image processing apparatus 100 to protect it from contamination and damages. The optical viewfinder 104 allows photographing using the optical viewfinder alone without using the electronic viewfinder function implemented by the image display unit 28. In the optical viewfinder 104, some functions of the indication unit 54, e.g., an in-focus indication, camera shake alert indication, flash charging indication, shutter speed indication, aperture value indication, exposure correction indication, and the like are placed.

The image display unit open/close detection means 106 can detect whether or not the image display unit 28 is stored with its display surface facing the image processing apparatus 100. If the detection means 106 detects such storage state, it can stop the display operation of the image display unit 28 to inhibit unnecessary power consumption.

A communication means 110 has various communication functions such as RS232C, USB, IEEE1394, P1284, SCSI, modem, LAN, radio communication, and the like. A connector or antenna 112 (in case of a radio communication) connects the image processing apparatus 100 to another device via the communication means 110.

The recording medium 200 uses a memory card, hard disk, or the like. The recording medium 200 comprises a recording unit 202 comprised of a semiconductor memory, magnetic disk, or the like, an interface (I/O) 204 with the image processing apparatus 100, and a connector 206 for connecting the image processing apparatus 100. The recording medium 210 also uses a memory card, hard disk, or the like. The recording medium 210 comprises a recording unit 212 comprised of a semiconductor memory, magnetic disk, or the like, an interface 214 with the image processing apparatus 100, and a connector 216 for connecting the image processing apparatus 100.

The electronic flash unit 400 has a connector 402 to be connected to the accessory shoe of the image processing apparatus 100. The unit 400 includes an electronic flash 404 which has a function of projecting AF auxiliary light and the flash light control function.

Figure 2:
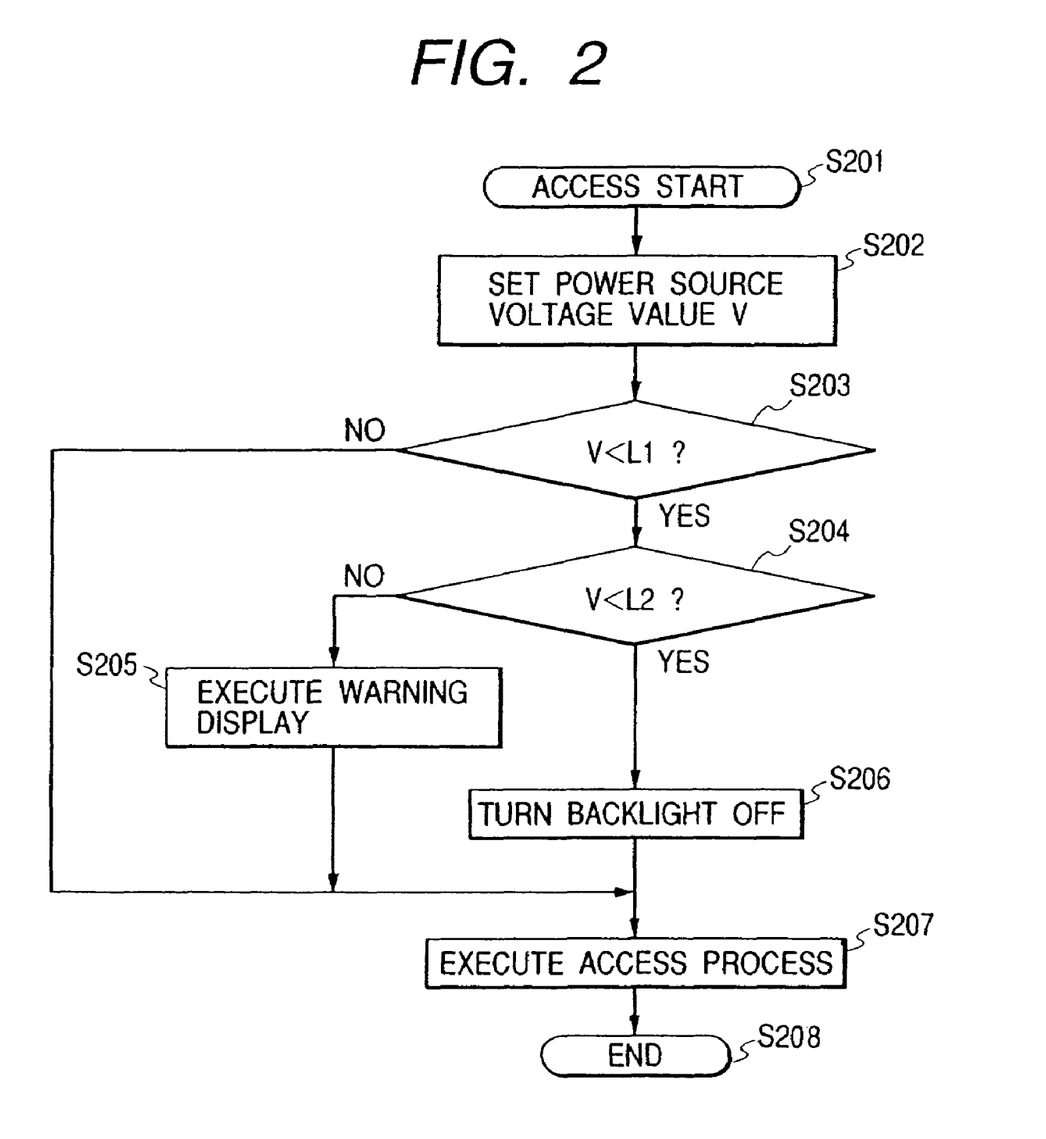
FIG. 2 is a flowchart showing processing contents for a power source control in the embodiment.

Power source control done in such system arrangement will be explained below with reference to FIG. 2. A program, the contents of which are shown in FIG. 2, is read out from the memory 52 and is executed by the system control circuit 50, when the system control circuit 50 writes data in the recording medium 200.

The system control circuit 50 writes data in the recording medium 200/210, when the photographed still or moving image is recorded (first), when various data are written to generate a file that designates the print contents of recorded images on the recording medium 200/210 (second), when a system process for writing the identification name of a file or image recorded on the recording medium is done (third), and the like. Power source control will be explained below taking as an example a case wherein a file for designating the print contents is generated.

The power source control means 80 detects and monitors the supplied voltage. When the system control circuit 50 starts access to the recording medium 200 in accordance with an operation instruction from the operation unit, the program shown in FIG. 2 is started (S201). The system control circuit 50 sets a detected power source voltage value V from the power source control means 80 (S202), and compares it with a voltage warning level L1 (S203).

If the power source voltage value V is higher than the warning level L1, an access process to the recording medium 200 is executed (S207), thus ending the processing sequence.

On the other hand, if V<L1, the system control circuit 50 compares the power source voltage value V with an inoperative level L2 (S204). If the power source voltage value V is higher than the inoperative level L2 (L1>L2), a battery warning display is made (S205). Subsequently, the system control circuit 50 executes an access process (S207), and ends the processing sequence shown in FIG. 2. On the other hand, if V<L2, since the operation cannot be continued, the system control circuit 50 sends a backlight OFF command of the image display unit 28 to the power source control means 80 to turn off a backlight (S206). Then, the system control circuit 50 proceeds with the access process to the recording medium 200, and ends the processing sequence shown in FIG. 2 (S207→S208). Finally, upon completion of the processing sequence shown in FIG. 2 (S208), the system is shut down, and the other indication unit 54 displays a message "Lb" indicating an inoperative state resulting from the power source voltage drop, thus informing the user of the current status. The values L1 and L2 are determined in advance, and are defined in the program.

Note that the power source control of the present invention is associated with a file access of the reproduction processing apparatus, and more particularly, a data write, and is not limited to generation of a print designation file. For example, when image data is recorded in the recording medium 200 or 210, or when the current voltage level cannot proceed with a process during erasure of all images in the recording medium 200 or 210, the process can be continued by turning off the backlight of the image display unit 28. At this time, an LED or the like may be used to inform the user that the process is underway. In this case, when an indication means such as an LED or the like is used in place of the image display unit 28, excessive power consumption can be prevented, and the user can recognize that the image process is underway or image display is stopped immediately due to electric power drop, not a trouble of the apparatus.

Likewise, an initialization process of the recording medium can be implemented using the above embodiment.

In either case, when a process instructed at the operation unit or a specific control process is executed, the process shown in FIG. 2 is executed. In this case, the access process shown in FIG. 2 corresponds to the process instructed at the operation unit or the control process instructed from another program that the system control circuit 50 is to execute.

Figure 3:
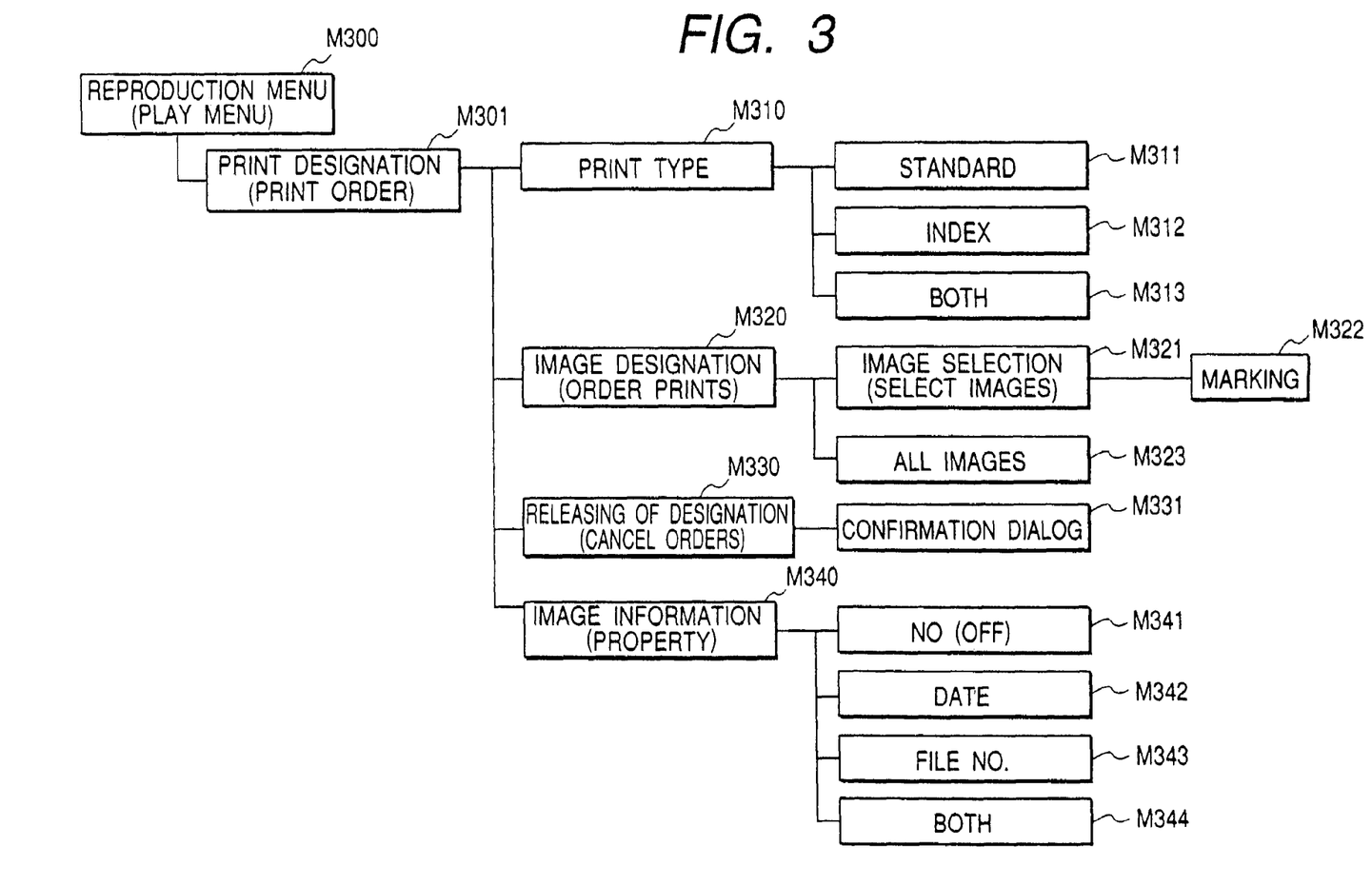
FIG. 3 is an illustration showing display contents relating to a print destination.
Figure 4:
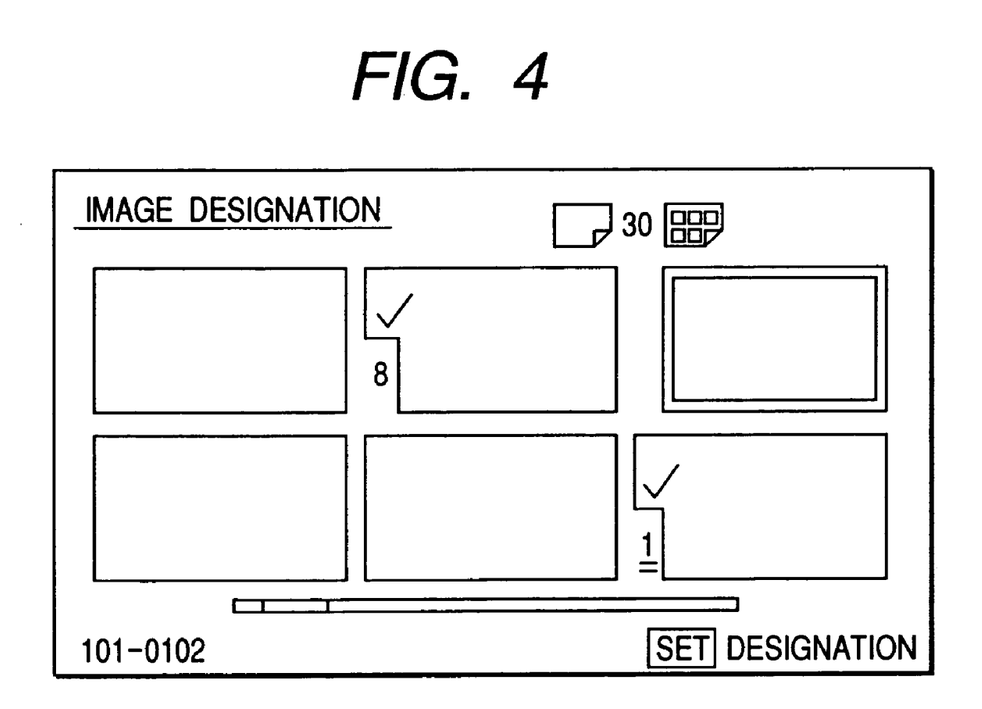
FIG. 4 is a illustration showing an example of an image selecting screen.
Figure 5:
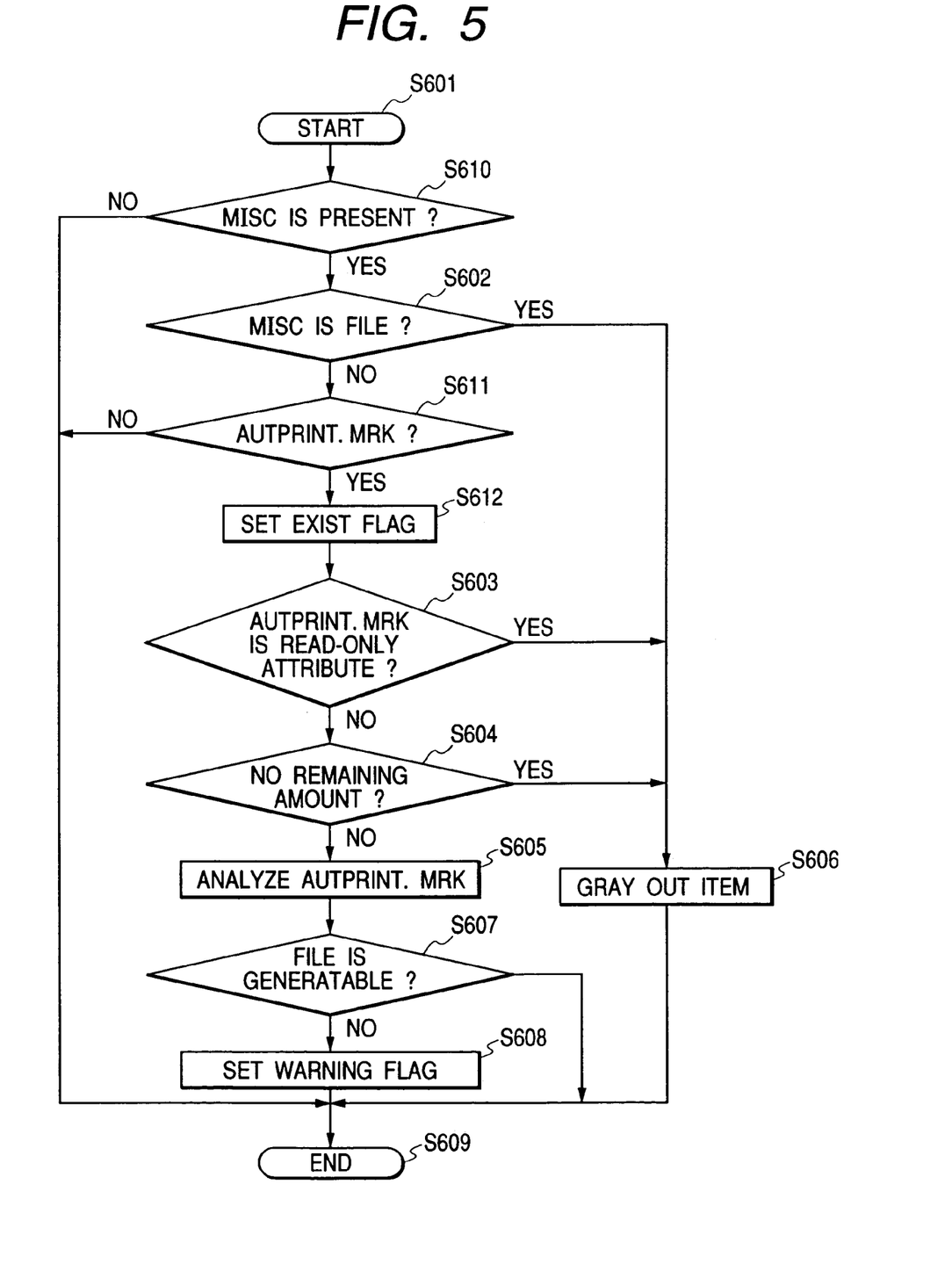
FIG. 5 is a flowchart showing part of a preparing process of a print destination file in the embodiment.

The aforementioned print designation process will be explained below using FIGS. 3 to 6. FIG. 3 is a block diagram showing the processing contents of print designation. FIG. 4 shows an image select window for designating an image to be printed. FIG. 5 shows the contents of a program for implementing the detection/analysis flow of a print designation file stored in the recording medium 200 or 210.

When the user sets the mode dial 60 at the position of "PLAY", the reproduction mode is started, and the system control circuit 50 analyzes a print designation file in the recording medium 200 or 210.

In order to check the presence/absence of a print designation file, the system control circuit 50 searches a root directory of the recording medium 200 or 210 for a directory named MISC (the directory name of a print designation file) (S610 in FIG. 5).

If MISC is not found, it is determined that no print designation file is present, and the analysis process ends (S609). The system control circuit 50 then checks if MISC is a file (S602). If MISC is not a directory but a file, a print designation item in a reproduction menu M300 in FIG. 3 is grayed out (S606), and the processing sequence shown in FIG. 5 ends (S609).

If MISC is a directory (NO in step S602), it is determined (checked) if a file AUTPRINT.MRK is present in the MISC directory (S611). If no such file is present, the processing sequence shown in FIG. 5 ends (S609).

If AUTPRINT.MRK is found, the system control circuit 50 sets an EXIST flag indicating the presence of a mark file (S612), and checks the attribute of the AUTPRINT.MRK file (S603). If AUTPRINT.MRK has a read-only attribute (i.e., a write inhibition attribute), the print designation item in a reproduction menu M300 is grayed out, and the processing sequence shown in FIG. 5 ends (S603→S606→S609).

If the attribute enables write, i.e., data can be written in AUTPRINT.MRK, the system control circuit 50 checks the remaining amount of the storage capacity of the recording medium 200 or 210 (S604). If the remaining amount of the recording medium 200 or 210 is not large enough to store one print designation information, the system control circuit 50 grays out the print designation item in the reproduction menu M300, and ends processing (S604→S606→S609).

If the recording medium 200 or 210 has a sufficiently large remaining amount, the AUTPRINT.MRK file is analyzed (S605). In file analysis in step S605, it is checked if the file has a syntax that the apparatus of this embodiment can generate, and if the designated image to be printed is stored in the recording medium 200 or 210. If both the conditions are satisfied, it is determined that the file can be generatable by the apparatus of this embodiment (YES in step S607).

The file analysis result is set in a print type variable, image information variable, designated print count, and total standard print count variable. Of these variables, the print type variable value and image information variable value are set on the nonvolatile memory 56. If it is determined in step S607 that the file is not generatable by the apparatus of this embodiment, a warning flag to be displayed in a print designation menu M301 is set (S607→S608), and the processing sequence shown in FIG. 5 ends (S609).

If it is determined that the file is generatable by the apparatus of this embodiment, the processing sequence shown in FIG. 5 ends (S609) (S607→S609). Upon completion of the aforementioned analysis process, the system control circuit 50 reproduces an image stored in the recording medium 200 or 210.

When the user has pressed a menu button of the operation unit 70 during image reproduction, the reproduction menu M300 shown in FIG. 3 is displayed on the image display unit 28. On the reproduction menu, the item position is moved by +/− buttons on the operation unit 70, and a given item is determined by a SET button.

When the print designation item in the reproduction menu is displayed, if the EXIST flag is set, the system control circuit 50 displays a check icon beside the item "print designation" on the basis of the file analysis result to inform the user of the presence of the print designation file.

When a given item is set to be grayed out, that item is grayed out so as not to be selectable from the menu. Furthermore, when the warning flag is set in the process in step S608, a "!" icon which means that information is rewritten is displayed. Upon depression of the SET button on the print designation item, the print designation menu M301 (see FIG. 3) is displayed.

Upon displaying the print designation menu M301, the system control circuit 50 acquires the print type variable and image information variable from the nonvolatile memory 56, and sets them in print type M310 and image information M340 of the menu. Also, the circuit 50 refers to the print designation count and total standard print count variable and displays them beside an item "image designation" M320.

In the print designation menu M301, items "print type" M310, "image designation" M320, "releasing of designation" M330, and "image information" M340 are selectable items. Upon depression of the SET button on the item "print type" M310, items "standard" M311, "index" M312, and "both" M313 are selectable, and one of these items is selected by the SET button.

When the user has pressed the MENU button at that time, selection is canceled, and the print designation menu M301 is displayed again. Note that the item "both" M313 means that print designation is made by both "standard" and "index". This setting value is set in the nonvolatile memory 56.

When the user selects "image designation" M320, items "selection image" M321 and "all images" M323 are selectable. When the items "selection image" M321 and "marking" M322 successively are selected, the marking mode shown in FIG. 4 is started. When the user selects the item "all images" M323, all images recorded in the recording medium 200 or 210 undergo print designation.

When the number of images is limited by limitations on the print designation syntax, the system control circuit 50 designates the number of images including the latest image, and displays a "✓" icon beside the print count indication. When all images in the recording medium 200 or 210 cannot undergo print designation due to the limited CF remaining amount, the system control circuit 50 displays the "✓" icon beside the count indication, and also displays a message "CF card is full" on the lower portion of the window, thus informing the user of the reason.

The operation in the marking mode will be explained below with reference to FIG. 4. The following operations are done in the marking mode.

(1) An image is moved by [+] or [−].

(2) An image is marked by [SET]. The number of images=1.

(3) The mark of the already set image is canceled by [SET].

(4) The print count is displayed beneath the check mark.

(5) The number of images is incremented by [SET]+[+]. The maximum number of images=29. When the number of images is incremented at "29", it returns to "0".

(6) When the number of images set has reached 10, the numerical value is underlined. The underline is displayed in units of 10 images.

(7) The number of images is decremented by [SET]+[−]. The set value is canceled when the number of images is set at "0". When the number of images is decremented at "0", it shifts to "29".

(8) When the number of designated images has exceeded the maximum value, [SET] designation is grayed out to disable marking.

(9) The total standard count (right) is displayed on the upper right position of the window.

(10) When the print designation file describes 29 or more images, "✓" is displayed. Note that the corresponding file is handled as the file to be changed. (That is, the mark is erased upon depression of [SET], and after that, setups are allowed.)

(11) When a main image is other than JPEG, [SET] designation is grayed out to disable setups.

(12) Upon designating an index print, the number of images that can be set is only "1", and no numerical value is displayed. (That is, only a check mark is displayed.)

(13) Upon depression of the MENU button, the print designation menu is displayed again.

When the item "releasing of designation" M330 is selected, a confirmation dialog M331 for releasing all the currently set print designations is displayed. If "releasing of designation" is canceled, a releasing process is canceled, and the print designation menu is displayed again. If execution is selected, all print designations are released, and when a print designation file is present, that file is erased.

The item "image information" M340 in the print designation menu M301 is used to set a character print in the print process. An item "no" M341 is used to print selected one of items "date" M342 and "file number" M343 together with an image without designating a character print. An item "both" M344 is used to print both the date and file number.

Figure 6:
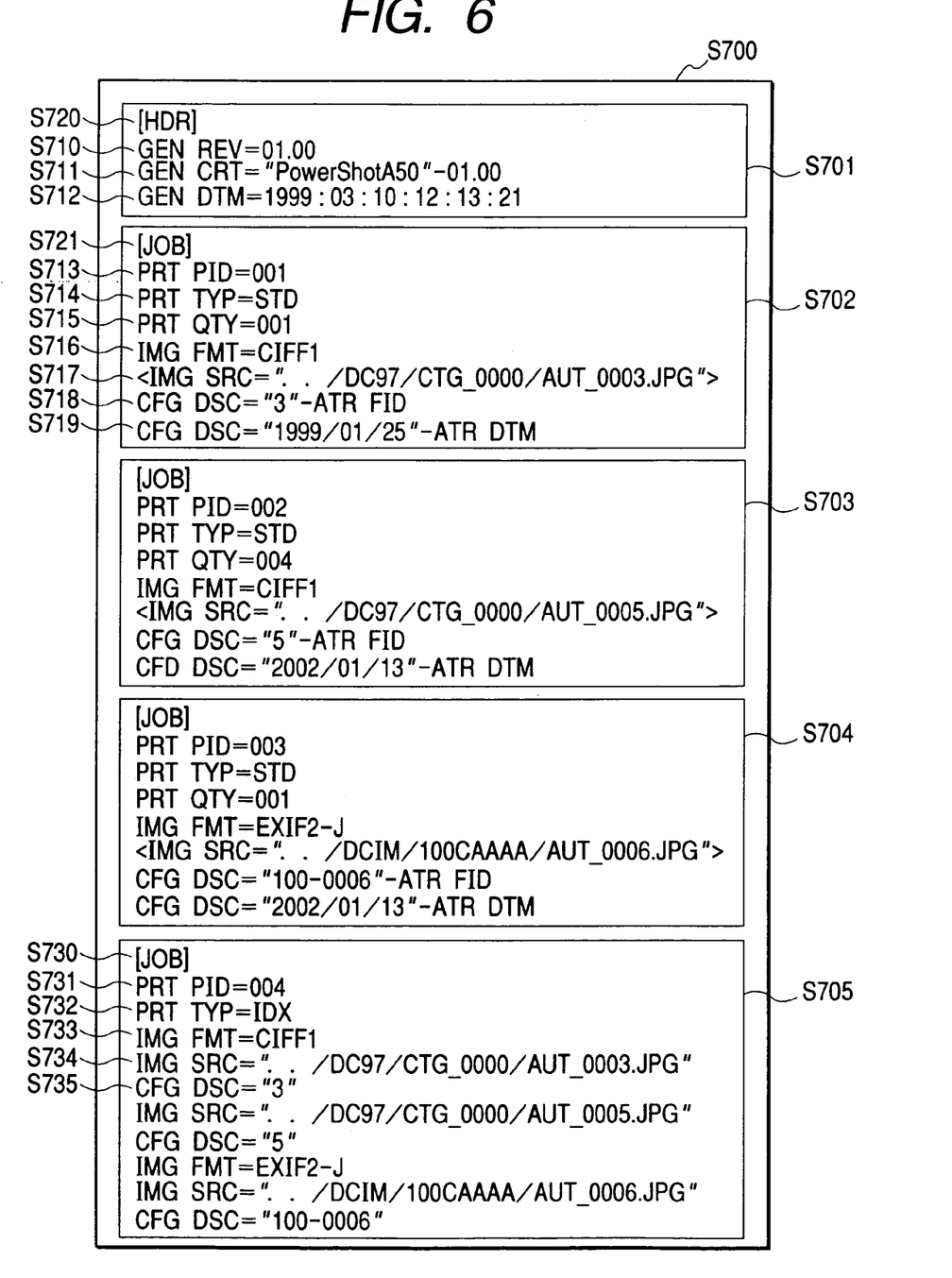
FIG. 6 is a illustration showing an example of a print destination file.

Print designation information set in accordance with the aforementioned designation method is saved in the recording medium 200/210 in the file format having contents shown in FIG. 6. Referring to FIG. 6, the entire print designation file is indicated by S700. The print designation file S700 is composed of a header section 701, and job sections S702, S703, S704, and S705. A tag S720 indicating the header section is described at the head position.

In the next line, information S710 indicates the version of print designation syntax. Subsequently, a model name S711 that makes file description is described. Current time information S712 is obtained from the internal timer of the system control circuit 50. The contents described in the header section S701 have been explained.

A print designation description (called a job section or standard job) S702 is described after the header section S701. In the example shown in FIG. 6, an image to be printed is selected in the print designation process, and standard print is designated as a print type.

A tag S721 indicates the job section. S713 is a value indicating the print order. S714 indicates a print type designated in M310 in FIG. 3. S715 indicates the number of images to be printed when the number of images is designated in the aforementioned marking mode. S716 indicates the format of the image to be printed. S717 indicates the file path (directory) of the image to be printed.

S718 indicates designation contents (file number print) of image information print according to designation of M341 in FIG. 3. S719 indicates designation contents of date print. The aforementioned standard jobs are described in correspondence with the number of images designated in the print designation process.

When "index print" and "both" are selected in M310 in FIG. 3, the index job S705 is described. The index job S705 also starts from a tag S730 that declares the job. S731 is a tag indicating the print order. S732 is a tag indicating a print type. S733 indicates the file format of the image to be printed.

S735 indicates print setups, which describe the file path of an image designated in the designation process, and setup information based on designations in S734 and M341 in FIG. 3. One of these pieces of information is described as S735 when only one image information is allowed to be printed or "both" is selected in M341 in FIG. 3 upon index print.

In this embodiment, the file number is described as an example. When there are a plurality of images designated by indices, if the next image format is different from that of the immediately preceding image, a job is described from S733; if the next image has the same format as that of the immediately preceding image, a job is described from S734. In this manner, the system control circuit 50 describes index jobs in correspondence with the number of images designated in the print designation file in the recording medium 200/210, thus ending generation of the index job S705.

The file of the print designation information set according to the aforementioned designation method is updated at the following timings:

(1) When the MENU key has been pressed in the print designation menu. In this case, a message "processing in progress" and progress bar are displayed on the lowermost portion of the menu, and the reproduction menu is displayed again upon completion of the processing.

(2) When movement is instructed by a dial. At this time, the message "processing in progress" and progress bar are displayed as in (1), and operation at the dial position is started upon completion of the processing.

(3) When the cover is opened. At this time, the message "processing in progress" and progress bar are displayed as in (1) and (2), and a warning sound is produced by a buzzer.

(4) When the system automatically shuts itself down. The message "processing in progress" and progress bar are displayed as in (1), and the system is shut down after updating.

(5) When the designated image to be printed is erased. In such case, RevisionID in the print designation file is evaluated, and if it is different from an ID generated by the camera, the file is not edited. The positions to be edited are the corresponding lines in an [HDR] section, a standard job section including the erased image, and an index job.

(6) When "Lb" is displayed. At this time, the LCD backlight is turned off, and a warning sound is produced using a buzzer. After that, the file is updated, and the system is shut down.

In any case, access to the recording medium is informed by flickering an LED during file updating.

After the LCD backlight is turned off, a new image or data other than an image is inhibited from being recorded. In this manner, such state can urge the user to exchange the power source, and all accesses to the apparatus can be prevented from being disabled due to full consumption of electric power.

As can be easily understood from the above description, according to this embodiment, when any power source voltage drop is detected during access to the recording medium to record or erase data, and the processing cannot be performed, the power source of the image display unit is turned off (shut down) to reduce unsuccessful processes.

In the above embodiment, the power source of the display unit is turned off. The present invention also includes a case wherein power consumption of the display unit is reduced to successfully attain processes in place of turning off the power source. For example, the display luminance or display area of the display unit may be reduced. Also, in order to detect the power supply performance, a current may be detected or the supply performance may be estimated from the use history or the like in place of detecting the power source voltage.

Furthermore, in place of reducing electric power to be supplied to only the display unit, electric power to be supplied to other devices (e.g., a communication device such as a modem or the like) may also be reduced.

Using the communication device, the photographed image can be sent to a desired communication device while being recorded on the recording medium such as a memory card. In such case, when the power supply performance drops during recording of image data, electric power to be supplied to the communication device may be cut or reduced to successfully record data on the memory card.

In addition to the above embodiment, the following embodiment is available.

1) In the above embodiment, the image processing apparatus such as a digital camera has been explained. Also, the present invention can be applied to various battery-driven information processing apparatuses that handle images.

As described above, according to the preferred embodiment of the present invention, when the voltage supplied from the power source drops abnormally, electric power to be supplied to the display means is reduced to relax an abnormal drop of the power source voltage, thus completing write access of data to the recording means. In this manner, the generation probability of data write errors can be greatly reduced.

Also, according to the preferred embodiment of the present invention, when a display means different from that for reproducing an image, e.g., an LED lamp or a display with small power consumption is used, electric power can be prevented from being excessively consumed, and the user can recognize that the image process is underway or image display is stopped immediately due to electric power drop in place of a trouble of the apparatus.

Upon completion of data write, since power supply to the entire apparatus is cut off to inhibit a new image from being recorded, such state can urge the user to exchange the power source, and access to the apparatus can be prevented from being totally disabled due to full consumption of electric power.

Also, the degree of battery voltage drop can be relaxed, and the battery itself can be protected.

Furthermore, not only data to be written but also the recording medium itself can be protected.

The present invention is not limited to the aforementioned embodiment, and various modifications may be made within the scope of the claims.

What is claimed is:

1. An image processing apparatus comprising:
   recording means for recording given image data or data other than the image in a recording medium;
   display means for displaying the image;
   power supply means for supplying electric power to said display means;
   judging means for judging, during a time when an image is confirmed in an image reproduction mode, if a power supply capacity of said power supply means becomes smaller than a predetermined first capacity;
   control means for turning off said display means when a judging result of said judging means in relation to the first capacity is affirmative;
   wherein, when said display means is turned off during the time the image is confirmed in the image reproduction mode, an indicating unit having a lower power consumption than the display means is turned on to indicate that a process is being executed and writing of data left to be stored is performed.

2. An apparatus according to claim 1, further comprising warning means for judging if the power supply capacity of said power supply means becomes smaller than second capacity larger than the first capacity, and producing a warning when a judging result is affirmative.

3. An apparatus according to claim 2, wherein said warning means is different from said display means for displaying the image.

4. An apparatus according to claim 1, wherein the power source is a battery.

5. An apparatus according to claim 1, wherein said recording means is a recording medium detachable from an apparatus main body.

6. An apparatus according to claim 1, further comprising output means for outputting the image data or the data other than the image to an external apparatus, and wherein said power supply control means controls a power supply capacity to said output means.

7. A method of controlling an image processing apparatus, comprising the steps of:
   recording given image data or data other than the image in a recording medium;
   displaying the image on a display device;
   judging, during a time when an image is confirmed in an image reproduction mode, if a power supply capacity of electric power supplied to the display device becomes smaller than a predetermined first capacity;
   controlling recording by turning off said display device when a judging result in said judging step in relation to the first capacity is affirmative; and
   wherein, when the display device is turned off during the time the image is confirmed in the image reproduction mode, an indicating unit having a lower power consumption than the display device is turned on to indicate that a process is being executed and writing of data left to be stored is performed.

8. A method according to claim 7, further comprising a warning step of judging if the power supply capacity of the electric power supplied to the display device becomes smaller than second capacity larger than the first capacity, and producing a warning when a judging result is affirmative.

9. A method according to claim 8, wherein the warning step includes the step of displaying the warning other than on the display device for displaying the image.

10. A method according to claim 7, wherein the electric power supplied to the display device is supplied from a battery.

11. A method according to claim 7, wherein the recording medium is a recording medium detachable from an apparatus main body.

12. A method according to claim 7, wherein the power supply control step includes the step of controlling a power supply capacity to an output device for outputting the image data or the data other than the image to an external apparatus.

13. A storage medium computer readably storing a program for implementing a method of controlling an image processing apparatus of any one of claims 7 to 9 and 10 to 12.

14. An image processing apparatus comprising:
   recording means for recording given image data or data other than the image in a recording medium;
   displaying means for displaying the image data on a display device;
   power supply means for supplying electric power to said image processing apparatus;
   judging means for judging, during a time when an image is confirmed in an image reproduction mode, if a power supply capacity of said power supply means becomes smaller than a predetermined first capacity; and
   control means for controlling turning off said display device when a judging result of said judging means in relation to the first capacity is affirmative; and
   power supply control means for reducing the electric power to be supplied to said image processing apparatus while assuring electric power to be supplied to said recording means when the supply capacity of said power supply means becomes smaller than the predetermined first capacity,
   wherein, when said power supply control means reduces the electric power to be supplied to said image processing apparatus, the display device is turned off and an indicating unit is turned on to indicate that a process is being executed, and
   wherein power consumption of said indicating unit is lower than power consumption of said display device.

15. A method of controlling an image processing apparatus, comprising the steps of:

recording given image data or data other than the image in a recording medium;

displaying the image data on a display device;

judging, during a time when an image is confirmed in an image reproduction mode, if a supply capacity of electric power supplied to said image processing apparatus becomes smaller than a predetermined first capacity;

controlling by turning off said display device when a judging result in said judging step in relation to the first capacity is affirmative; and reducing the electric power to be supplied to said image processing apparatus while assuring electric power to be supplied to said recording means when it is determined in the judging step that the supply capacity becomes smaller than the predetermined first capacity, wherein, when the electric power to be supplied to said image processing apparatus is reduced in said reducing step, the display device is turned off and an indicating unit is turned on to indicate that a process is being executed, and wherein power consumption of said indicating unit is lower than power consumption of said display device.

16. A storage medium computer readably storing a program for implementing a method of controlling an image processing apparatus of claim 15.

* * * * *

UNITED STATES PATENT AND TRADEMARK OFFICE
CERTIFICATE OF CORRECTION

PATENT NO. : 7,084,921 B1 Page 1 of 1
APPLICATION NO. : 09/542343
DATED : August 1, 2006
INVENTOR(S) : Yasuyuki Ogawa

It is certified that error appears in the above-identified patent and that said Letters Patent is hereby corrected as shown below:

ON THE TITLE PAGE, AT ITEM (54):
Title, "IMAGE PROCESSING APPARATUS WITH ANOTHER DISPLAY UNIT ITS CONTROL METHOD, AND RECORDING MEDIUM" should read --IMAGE PROCESSING APPARATUS WITH SEPARATE DISPLAY FOR DISPLAYING SYSTEM STATUS, ITS CONTROL METHOD AND RECORDING MEDIUM--.

COLUMN 1:
Lines 1-3, "IMAGE PROCESSING APPARATUS WITH ANOTHER DISPLAY UNIT ITS CONTROL METHOD, AND RECORDING MEDIUM" should read --IMAGE PROCESSING APPARATUS WITH SEPARATE DISPLAY FOR DISPLAYING SYSTEM STATUS, ITS CONTROL METHOD AND RECORDING MEDIUM--.

Signed and Sealed this

Third Day of July, 2007

JON W. DUDAS
*Director of the United States Patent and Trademark Office*